(Model.)

P. STUART.
MANUFACTURE OF COMPOSITE PAVEMENTS.

No. 248,526. Patented Oct. 18, 1881.

Attest:
Harry E. Knight
J. M. Hopkins

Inventor:
Peter Stuart
By Knight Bros
Attys

UNITED STATES PATENT OFFICE.

PETER STUART, OF EDINBURGH, COUNTY OF MID-LOTHIAN, NORTH BRITAIN.

MANUFACTURE OF COMPOSITE PAVEMENT.

SPECIFICATION forming part of Letters Patent No. 248,526, dated October 18, 1881.

Application filed April 25, 1881. (Model.) Patented in England, February 12, 1881.

*To all whom it may concern:*

Be it known that I, PETER STUART, a citizen of the United Kingdom of Great Britain and Ireland, residing at Edinburgh, in the county of Mid-Lothian, North Britain, have invented certain new and useful improvements in the manufacture of composite pavements, floors, platforms, landings, stair-steps, and the like, and of ornamental work in imitation stone and in composition therefor, (for which I have received Letters Patent in Great Britain No. 610, dated February 12, 1881;) and I do hereby declare that the following is a full, clear, and exact description of the invention, which will enable others skilled in the manufacture to which it appertains to make and use the same.

This invention relates to the manufacture and laying of composite pavements, floors, platforms, landings, stair-steps, "plats," and the like, and to an improved composition to be employed for these purposes and for the manufacture of ornamental work in imitation stone—such, for example, as balustrading, columns, cornices, pilasters, trusses, vases, and the like—and has for its object to produce the same equal, or nearly equal, to stone, and at a cheaper rate than hitherto made.

In constructing a pavement according to the invention the ground is first excavated to a depth of seven inches or other depth, according to the strength of pavement required. A layer of stone or other equivalent material, broken or sized to pass through a two-and-a-half-inch ring and free from sand or other earthy matter, is spread level in the excavation to a depth of about three inches, and on the stones a layer of concrete is spread. The object of so laying down dry stones is to prevent damp from rising to and frost from injuring the concrete and the superstructure of composition which is laid thereon, as hereinafter described. Previous to laying down the concrete the bed of stones is divided or pinned off into squares varying from three to twenty feet, according to the size of slabs it is desired to produce, and in constructing the pavement the concrete is first laid on alternate squares, both as regards the length and breadth of the pavement.

Figure 1:
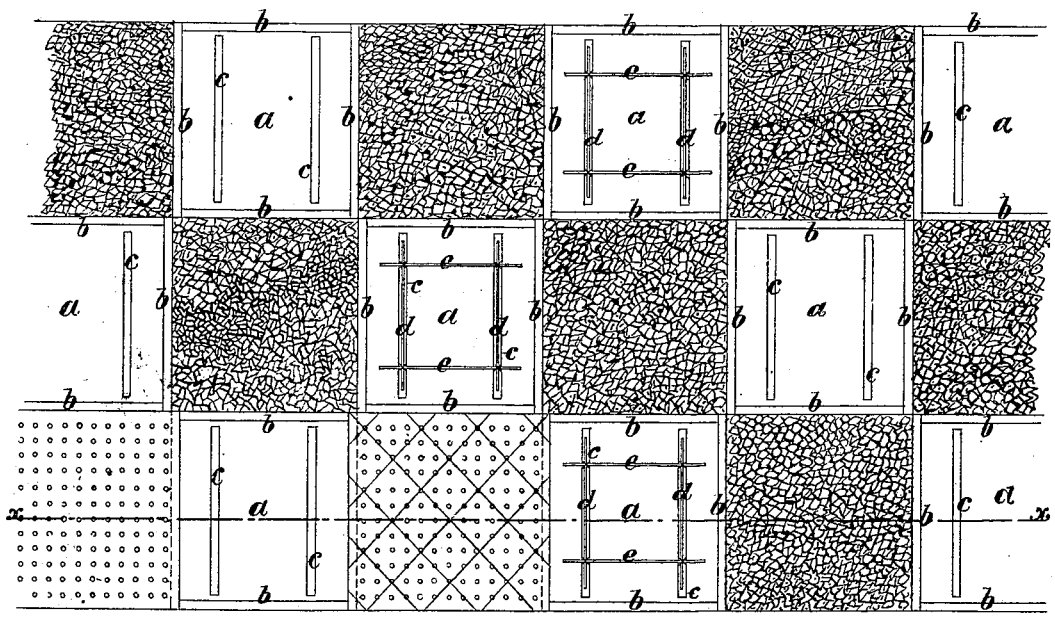

The diagram, Figure 1, of the drawings hereto appended, shows the method of laying, *a* being the squares covered with concrete.

The concrete is composed of crushed stones, brick, slag, or gravel, sized to pass through a one-inch ring, mixed with Portland or other suitable cement in the proportion of one part of cement to five parts of either of the said materials, and a sufficient quantity of water to render the whole plastic, the mixing being effected by means of a steam or hand pug-mill or by hand-labor. A proportion of finely-ground or pulverized hematite, magnetic or black oxide, or other iron ore may be added to the mixture of concrete when desired, the said ore being first finely ground or pulverized and mixed separately with water, after which it is added to the concrete in the mill. When thoroughly mixed the concrete is spread in alternate squares on the stones to a depth of two inches or other thickness, according to the strength required, and then properly leveled with a straight-edge, after which it is rolled flat and compressed by a heavy roller. Rectangular wooden battens or rods are then laid on the top of the concrete, around the four sides of each square, as indicated at *b*, Fig. 1, and if the paving is for outside purposes two or more V-shaped or rectangular grooves are cut in each slab parallel to two of its sides, as indicated at *c*, Figs. 1 and 2. These grooves are or may be formed by passing a roller having a correspondingly-shaped flange or projection on its circumference over the slabs before the concrete has set hard, or the said grooves may be formed by hand or otherwise. An iron bar or rod, preferably rectangular, is laid in each groove with its upper edge level with the surface of the concrete, as indicated at *d*, and other iron rectangular rods, *e*, are laid on the surface of the concrete at right angles to the rods *d*.

The rods *d* and *e* cross each other, and their ends project beyond the points of intersection, the two sets of rods being secured together at the said points by wire or other equivalent ties.

When curbs and gutters or water-channels are to be formed along with the pavement wooden boarding is fixed to the line of the curb before laying the concrete, and the rods *d*, situated in the grooves, extend into the curb, while another rod, fastened on top of the rod *d* with wire or its equivalent, extends along the center of the curb. These rods constitute binding and strengthening beams for the pavement. Instead of embedding one set of them in grooves, as before set forth, both sets may be laid on the surface of the concrete, and additional strength may further be given to the pavement by extending a series of iron wires from one side to the other of the squares formed by the rods on each slab.

When drains or water-pipes are laid below the pavement the slabs above the said drains or pipes, instead of being bedded on broken stones, are bedded on sand or wood boarding, whereby they are rendered removable, in order that repairs may be effected when necessary.

On the surface of the concrete a composition of granite, (cubed to the size of three-eighths of an inch and under,) with Portland or other suitable cement, and with or without finely ground or pulverized hematite, magnetic or black oxide, or other iron ore, is spread. These ingredients may be employed in various proportions. I have obtained good results with two parts of cubed granite to one and a quarter part of cement, three parts of granite to two of cement, and two parts of granite to one of cement. The granite and cement, having been mixed together and sifted through a half-inch sieve, are thoroughly amalgamated in a steam or hand pug-mill or by hand-labor, a sufficient quantity of water being added to render the whole plastic. When used the ground or pulverized ore is separately mixed with water, as before set forth. This composition, which I call "granolithic," is spread on the concrete, so as to embed the iron rods, and it is then leveled to an even surface with a straight-edge, the ends of which bear on the wooden battens or rods *b*, after which it is beaten or tapped all over, so as to break any air-bells and render the surface perfectly solid. A coating composed of dry cement, finely ground or pulverized hematite, or other iron ore, and dry sand is next floated into the lower layer of the granolithic composition, and the surface is then polished, and, to prevent slipping of the feet, indented by means of a roller having projecting teeth or spikes on its circumference, after which it may be crossed by a sharp-pointed tool into square, rectangular, diamond, or other shaped blocks.

Figure 3:
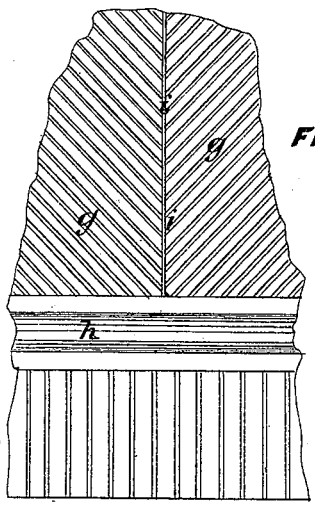

For stables and other like purposes the surface of the granolithic flooring of the stalls is preferably grooved with inclined indentations *g*, which run into a central groove or water-channel, *i*, as indicated at Fig. 3, the grooves being produced by means of a V-shaped iron rod, formed with a handle for convenience, and the water-run or channel *h* behind the stall is also indented into the surface of the granolithic.

When indentations or grooves are not required the pavement is finished smooth on the surface, in which case the dry composition of cement, hematite, and sand is not used.

The thickness of the layer of granolithic is regulated according to the strength of pavement required.

Figure 2:
Figure 4:

When the alternate squares have set sufficiently hard wooden battens or rods *b* are removed from around their sides, thereby leaving the under layer of concrete projecting beyond the upper layer of granolithic all round the square, as indicated at *f* on the section, Fig. 4. The edges of the concrete layer are cut beveled or straight down, and the intermediate squares are then fitted in with concrete and granolithic, precisely as hereinbefore described. By checking the edges of the squares first filled in in the manner indicated at *f*, Fig. 4, the layer of granolithic in the intermediate squares is caused to project over the layer of concrete in the squares on each side of it, as seen at Fig. 2; and while by this means damp is effectually prevented from percolating downward through the pavement, the construction at the same time permits one or more of these intermediate squares to be forced upward, in the event of such a pressure on the under side as would otherwise be liable to destroy a greater part of the pavement.

When the whole pavement has set the surface is painted over with a coating of silicate of soda or clear water and ground or pulverized hematite or other iron ore.

The hematite or other iron ore, hereinbefore specified as employed in the construction of the pavement, is in each case used to give color to the composition, red or black being generally the color employed, and consequently a greater or less amount of it is used, accordingly as a deeper or lighter color is desired. One part of hematite or magnetic oxide or other ore to six parts of combined granite and cement is a proportion frequently employed. When a very deep-red color is wished a proportion of red oxixe of iron is mixed with the hematite, and when other colors are desired a suitable color is substituted in place of the materials hereinbefore set forth.

When the pavement is to be the natural gray color of the granolithic composition no hematite or other coloring-matter is used.

In constructing inside floors or pavements—such, for example, as the floors of kitchens, laundries, wash-houses, schools, and halls—the iron rods hereinbefore specified as embedded between the layers of concrete and granolithic may, when great strength in the floor is not required, be dispensed with.

The granolithic composition, besides being used in the construction of pavements, floors, platforms, stair-steps, landings, plats, and the like, may also be used for the manufacture of ornamental work in imitation stone—such, for example, as balusters and balustrading, columns, copings, cornices, pilasters, trusses, vases, and other kinds of ornamental stone-work—by molding the composition in suitable molds while in a plastic state, screw, hydraulic, or other pressure being exerted on the molds to render the article solid.

I am aware that it is not new to make pavements in separate layers of composition, a lower layer of concrete and an upper one of blocks of cement faced with broken stone, the spaces between the blocks being filled with cement; or to spread an upper layer over a lower one, pressing the composition in the upper layer down to fill the cracks in the foundation; or to form a rough walking-surface on a composition pavement by stamping or depressing the same, or covering it with a layer of rough pieces of hard and flinty substances; or to spread over a foundation of stone a layer of concrete, placing upon the same blocks or pieces of stone and consolidating by ramming or rolling.

Having thus described my invention, the following is what I claim as new therein and desire to secure by Letters Patent:

1. The composite pavement or like structure consisting of a foundation of broken or crushed stone, a layer of compressed concrete above it, and above this a layer of granolithic consisting of cubed or broken granite mixed with cement, substantially as hereinbefore described.

2. The method of laying composite pavements or other like structures, consisting in laying first a foundation of crushed or broken stone, then a layer of concrete, and then a layer of granolithic, the layer of concrete in each alternate square projecting beyond the layer of granolithic composition, as and for the purposes set forth.

3. In a composite pavement or like structure comprising two or more layers of composition, the strengthening iron rods and wires embedded partly in the lower and partly in the upper layer, for the purpose set forth.

4. In combination with the composite pavement consisting of successive layers of crushed or broken stone, concrete, and granolithic, the top dressing composed of cement and sand floated into the body of the upper layer of broken granite and cement, substantially as and for the purposes set forth.

PETER STUART. [L. S.]

Witnesses:
   THOMAS MURRAY MACKAY,
   DANIEL CLARK,
*Both of 44 Frederick Street, Edinburgh,*
   *Law Clerks.*